(12) United States Patent
Okonkwo et al.

(10) Patent No.: US 11,966,698 B2
(45) Date of Patent: Apr. 23, 2024

(54) SYSTEM AND METHOD FOR AUTOMATICALLY TAGGING CUSTOMER MESSAGES USING ARTIFICIAL INTELLIGENCE MODELS

(71) Applicant: Chatdesk, Inc., New York, NY (US)

(72) Inventors: Aneto Okonkwo, New York, NY (US); Omasirichukwu Udeinya, New York, NY (US); Joomi Kim, New York, NY (US); Liam Geron, New York, NY (US); Chris Okebata, New York, NY (US); Andrew Olaleye, New York, NY (US); Chigozie Ezeani, New York, NY (US); Itunu Oyinkan Babalola, New York, NY (US); Elise Luc, New York, NY (US)

(73) Assignee: Chatdesk, Inc., New York, NY (US)

( * ) Notice: Subject to any disclaimer, the term of this patent is extended or adjusted under 35 U.S.C. 154(b) by 290 days.

(21) Appl. No.: 16/870,928

(22) Filed: May 9, 2020

(65) Prior Publication Data
US 2020/0356725 A1 Nov. 12, 2020

Related U.S. Application Data

(60) Provisional application No. 62/845,966, filed on May 10, 2019.

(51) Int. Cl.
G06F 40/284 (2020.01)
G06F 16/95 (2019.01)
(Continued)

(52) U.S. Cl.
CPC ............ *G06F 40/284* (2020.01); *G06F 16/95* (2019.01); *G06F 40/117* (2020.01); *G06F 40/30* (2020.01);
(Continued)

(58) Field of Classification Search
CPC ........ G06F 16/35; G06F 16/95; G06F 16/951; G06F 40/117; G06F 40/20; G06F 40/284;
(Continued)

(56) References Cited

U.S. PATENT DOCUMENTS 9,330,174 B1 * 5/2016 Zhang ..................... G06F 16/95
10,891,421 B2 * 1/2021 Weinreb ................ G06F 40/117
(Continued)

*Primary Examiner* — Chau T Nguyen
(74) *Attorney, Agent, or Firm* — Hailey Law LLC; Xavier L. Hailey

(57) ABSTRACT

A system and method for automatically tagging customer messages using artificial intelligence models. A server gateway processes the customer messages via an artificial intelligence system featuring artificial intelligence models. The artificial intelligence system analyzes the customer messages to determine the content by tagging words and phrases with industry specific tags (e.g. product feedback, product defects, shipping delays, etc) as well as tags based on sentiment type (e.g., negative, positive, neutral, sarcasm, mixed) and contact type (e.g., delivery person, influencer, postsale, presale). The artificial intelligence system returns the tagged results, which are transmitted by the server gateway to a user computational device or another system for visualization.

19 Claims, 17 Drawing Sheets

(51) Int. Cl.
  *G06F 40/117* (2020.01)
  *G06F 40/30* (2020.01)
  *G06N 3/042* (2023.01)
  *G06N 3/08* (2023.01)
  *G06Q 30/016* (2023.01)
(52) U.S. Cl.
  CPC .............. *G06N 3/042* (2023.01); *G06N 3/08* (2013.01); *G06Q 30/016* (2013.01)
(58) Field of Classification Search
  CPC .... G06F 40/30; G06N 3/0427; G06N 3/0454; G06N 3/08; G06N 7/005; G06N 3/042; G06Q 30/016
  See application file for complete search history.

(56) References Cited

U.S. PATENT DOCUMENTS

| | | | |
|---|---|---|---|
| 2016/0203566 A1* | 7/2016 | Kataria | G06Q 30/016 709/206 |
| 2018/0322411 A1* | 11/2018 | Wang | G06F 16/35 |
| 2019/0102614 A1* | 4/2019 | Winder | G06F 40/30 |
| 2019/0163742 A1* | 5/2019 | Yan | G06N 3/08 |
| 2019/0286711 A1* | 9/2019 | Terry | G06N 20/00 |
| 2020/0143225 A1* | 5/2020 | Lafontaine | G06N 3/0445 |
| 2020/0159778 A1* | 5/2020 | Mohanty | G06Q 30/0282 |
| 2020/0349415 A1* | 11/2020 | Raju | G06N 3/0454 |

* cited by examiner

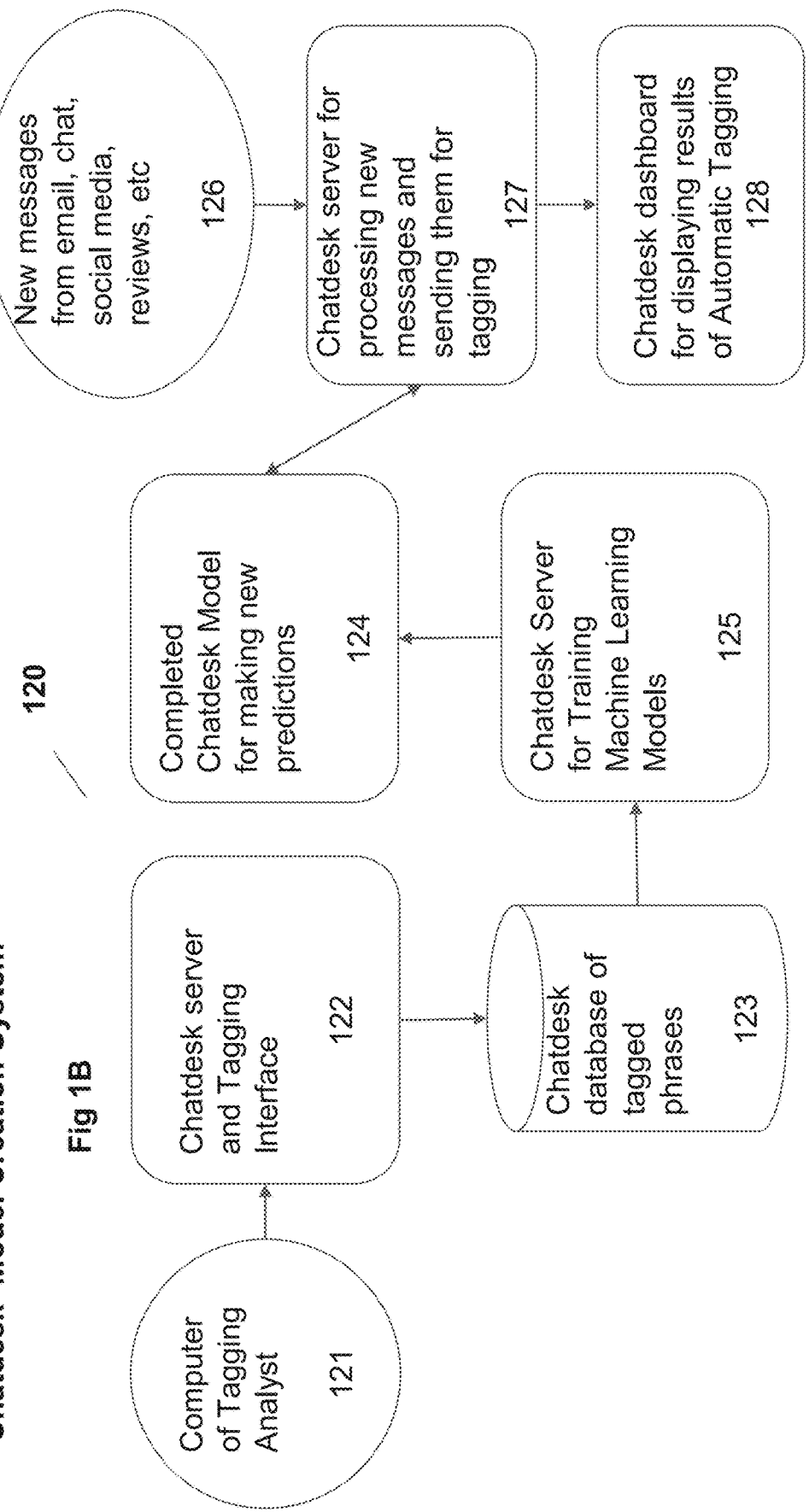

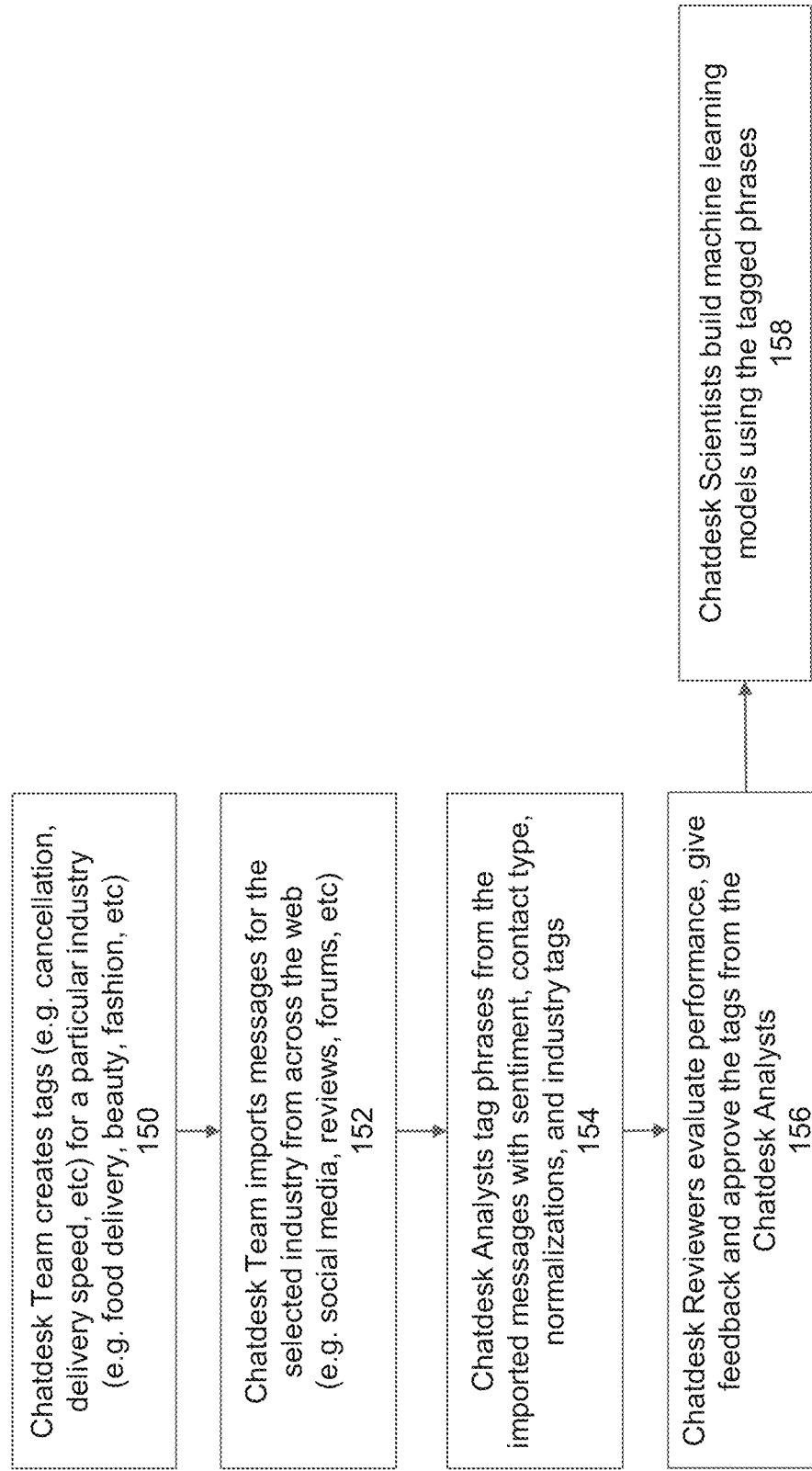

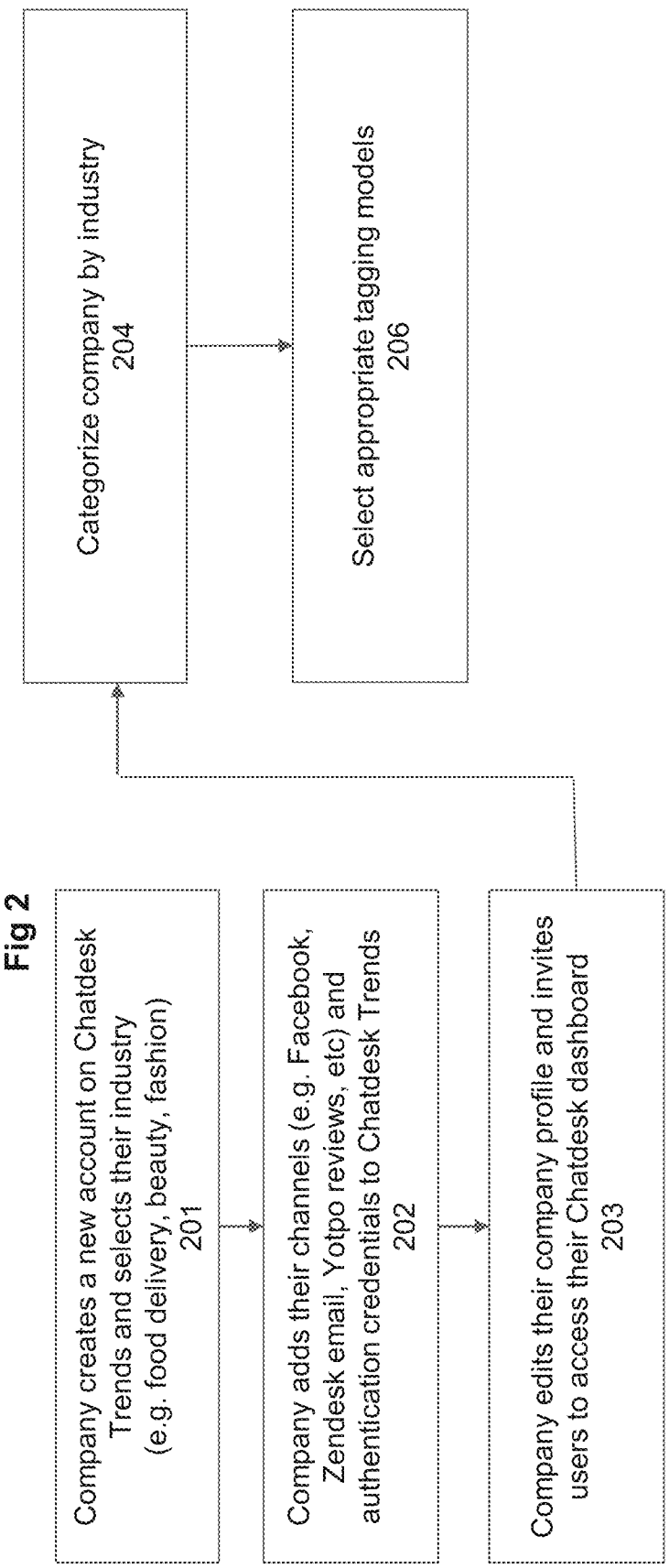

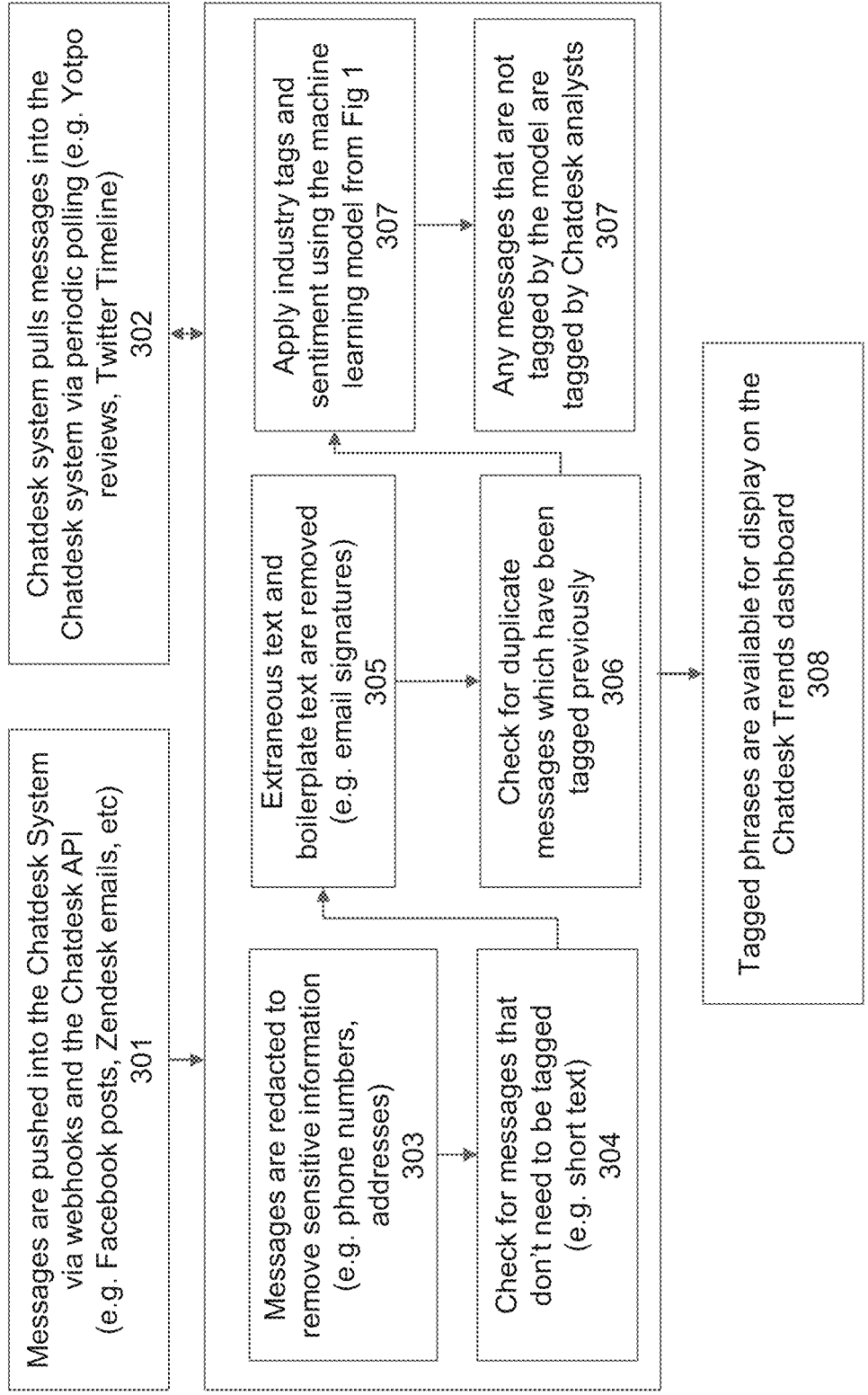

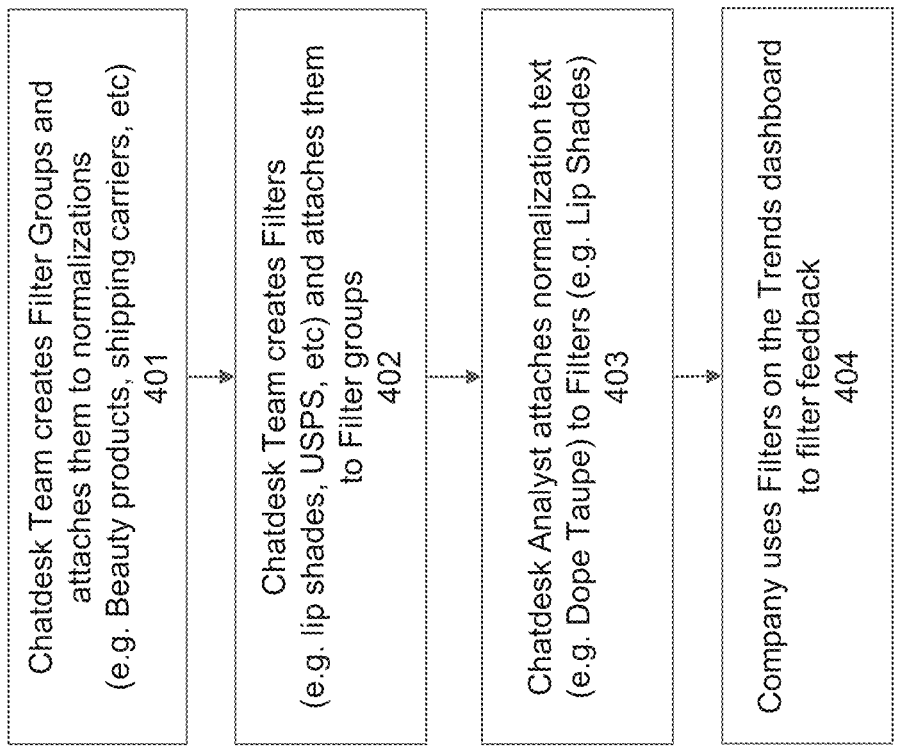

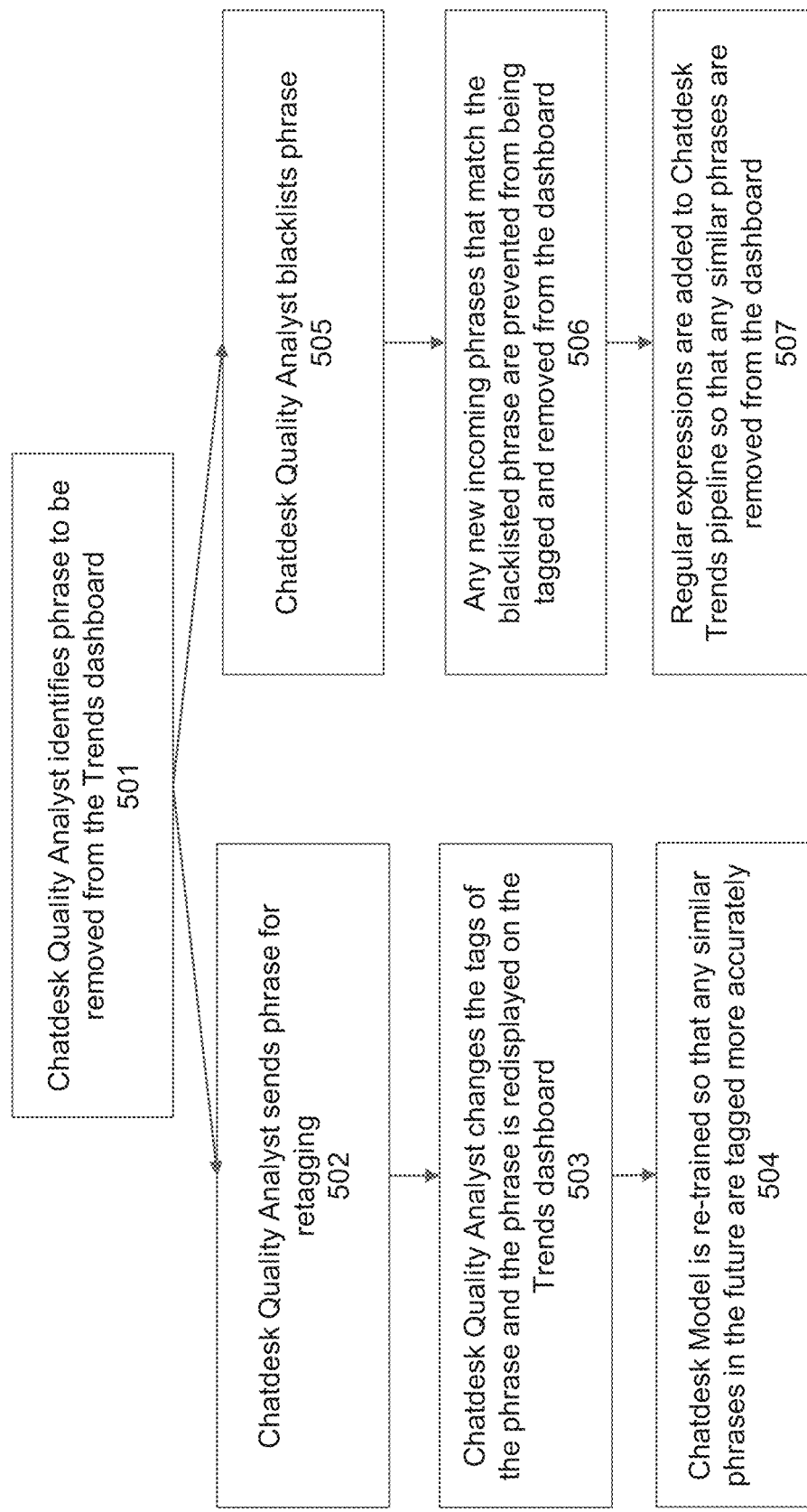

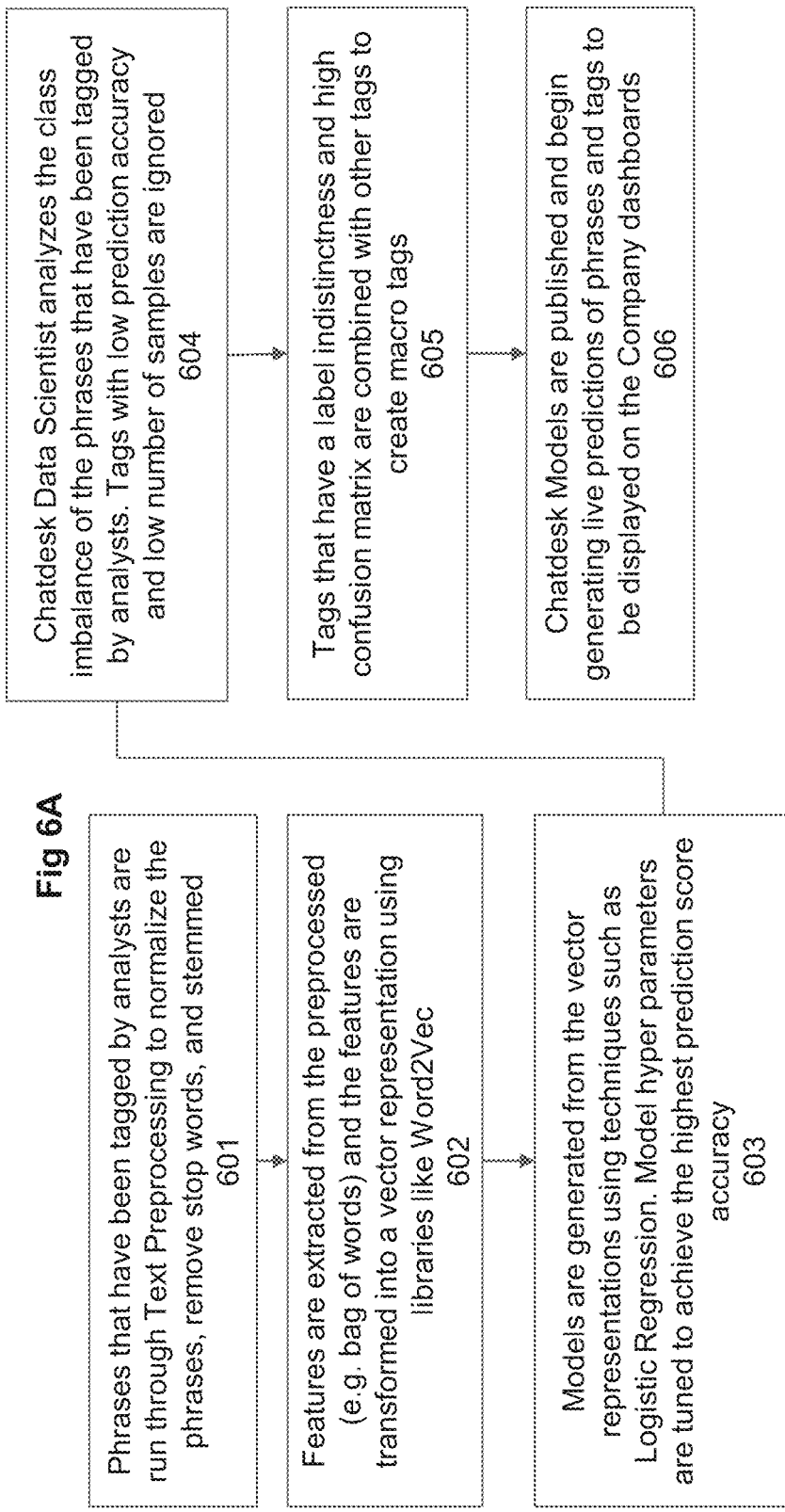
Fig 6A — Chatdesk Trends Tagging Model Development

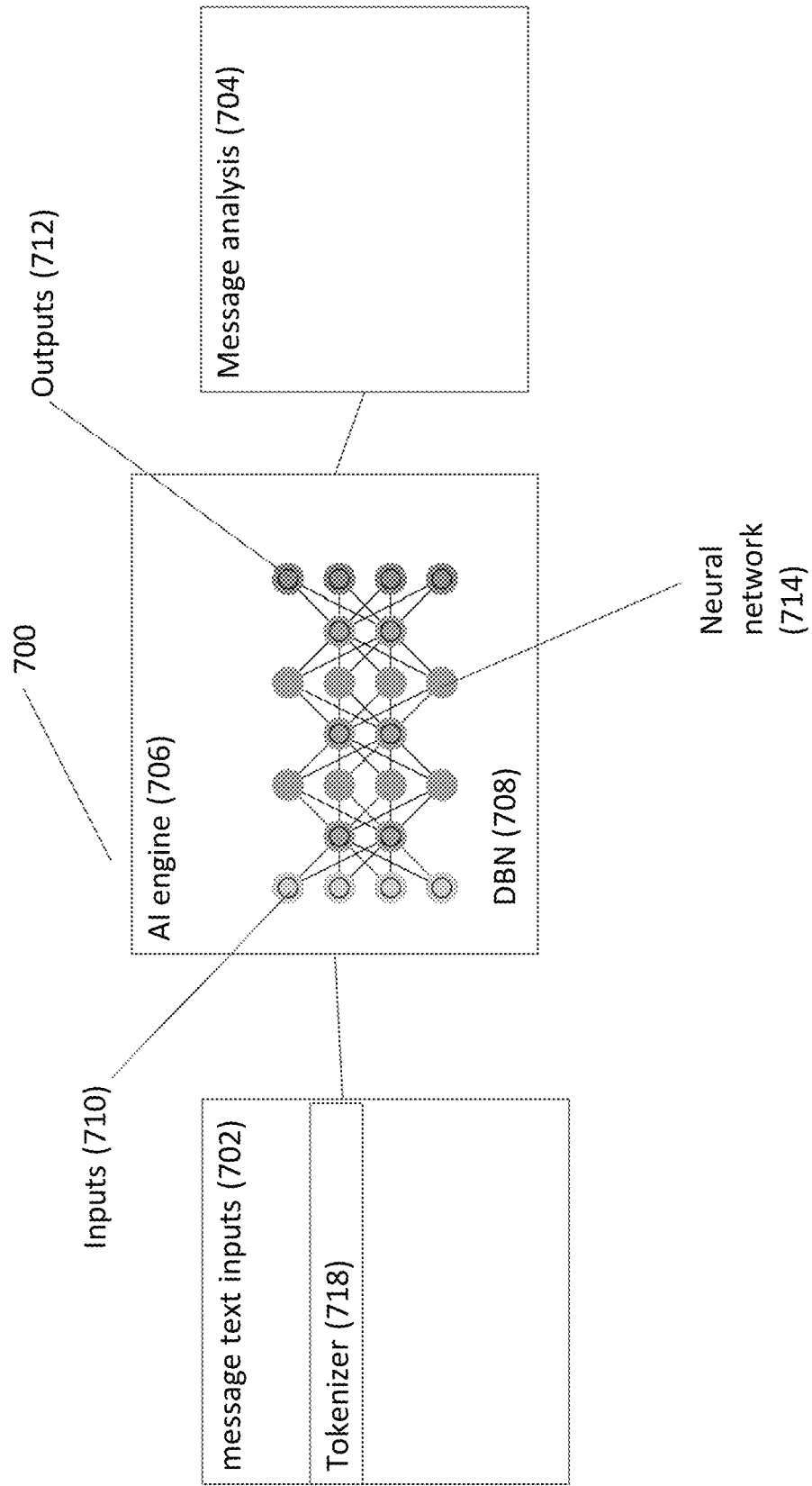
Figure 7A – AI system details I

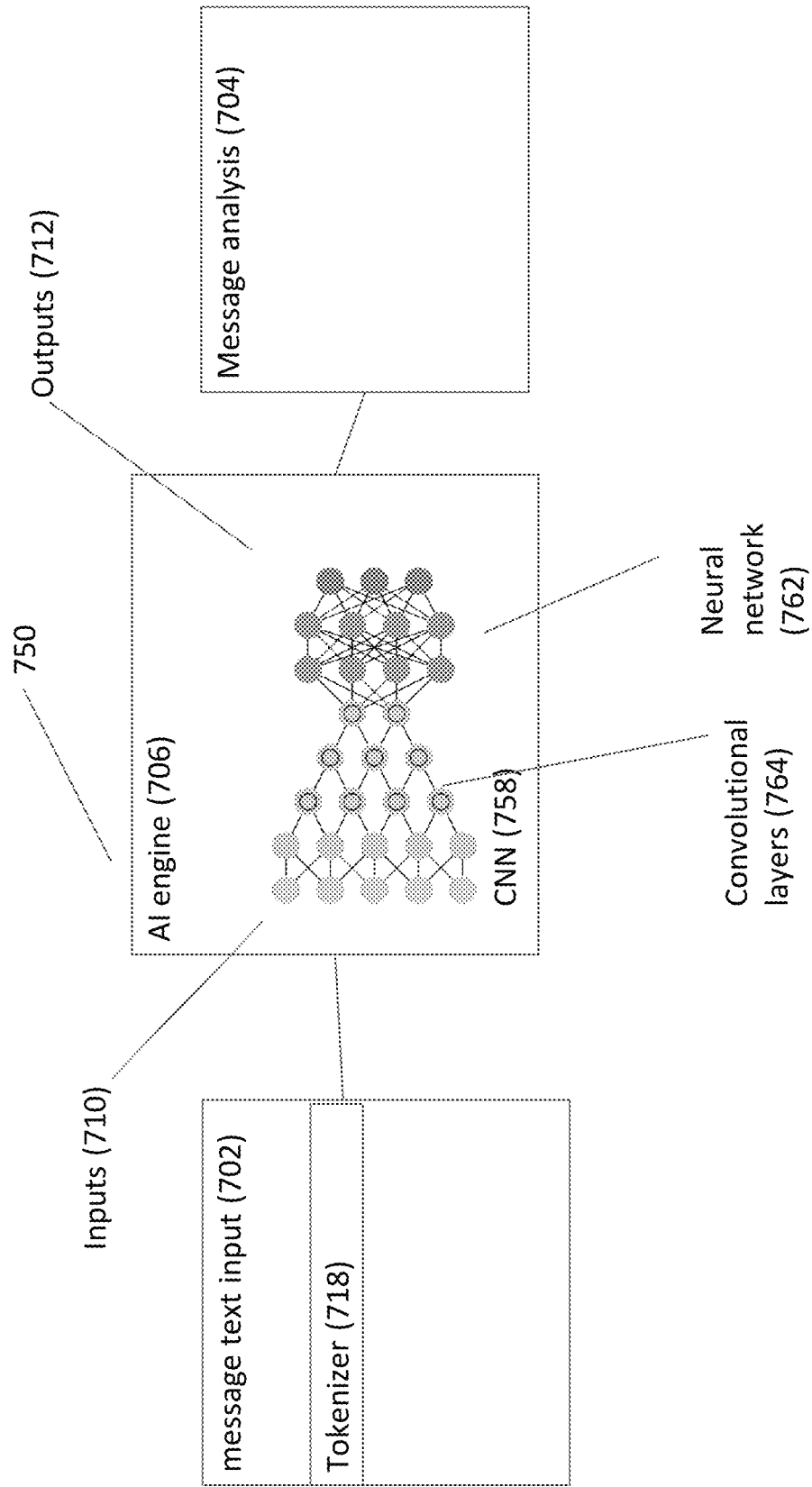

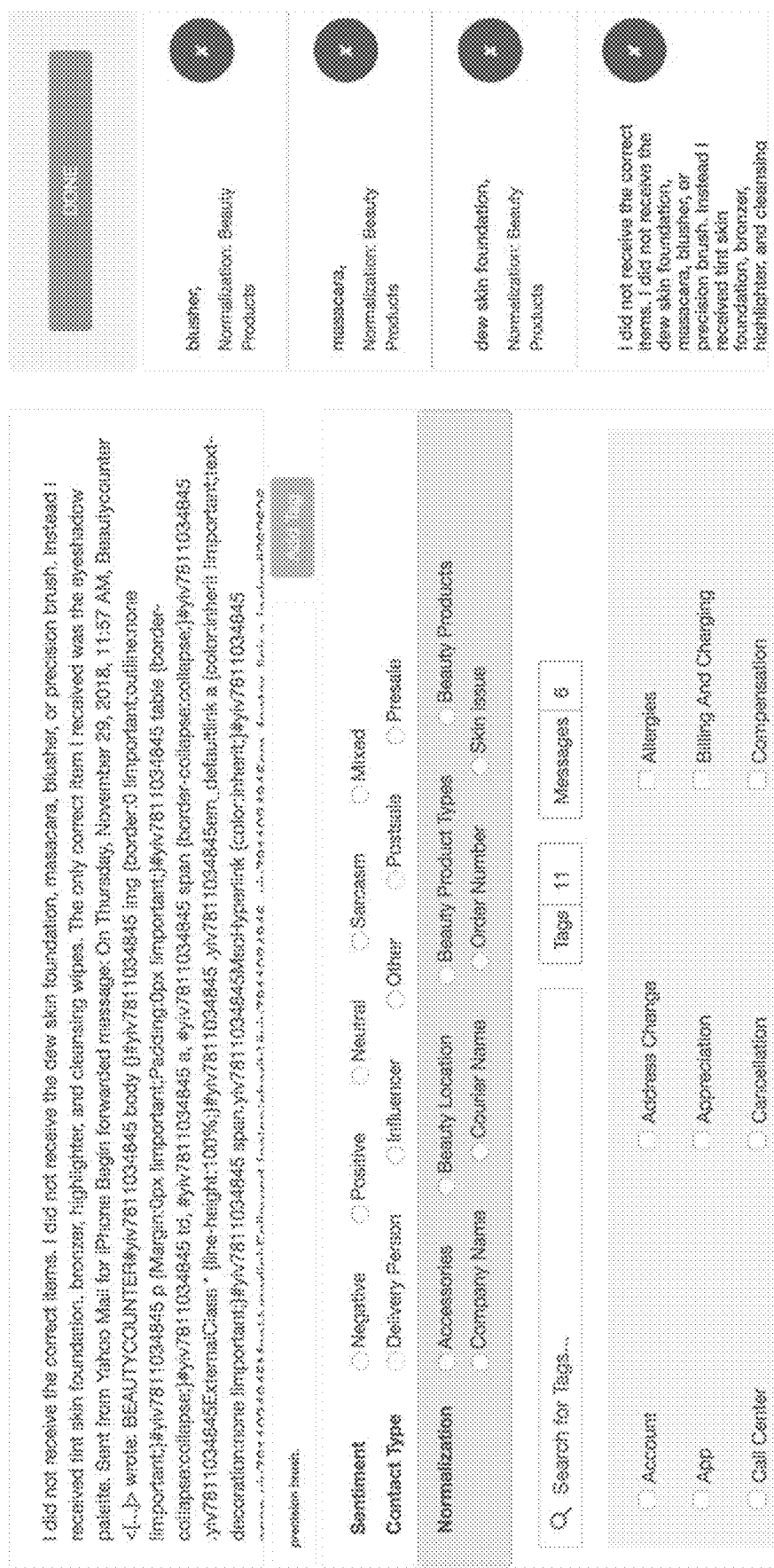
Figure 8 - Analyst Tagging Interface Example

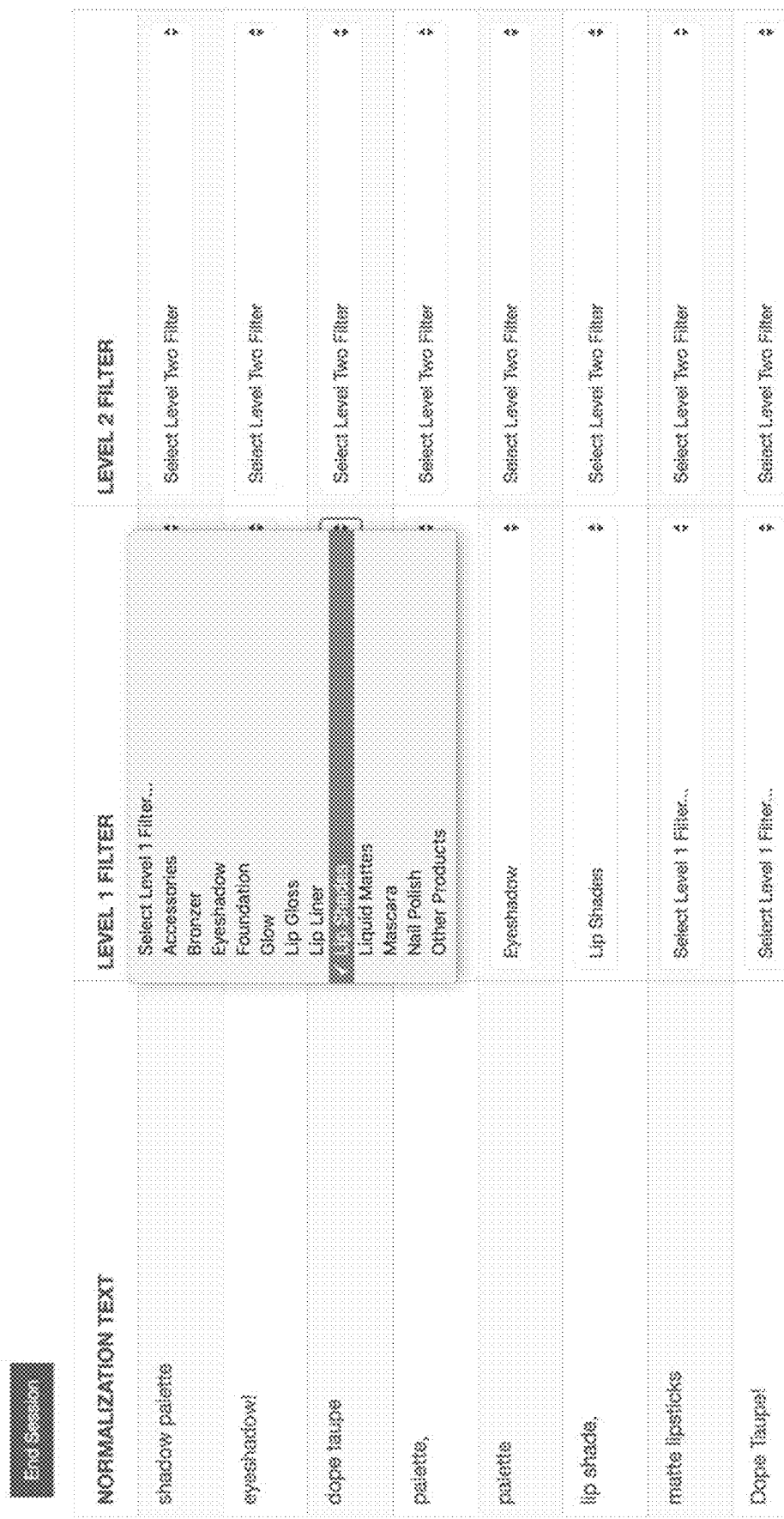
Figure 9 - Filter Tagging Interface Example

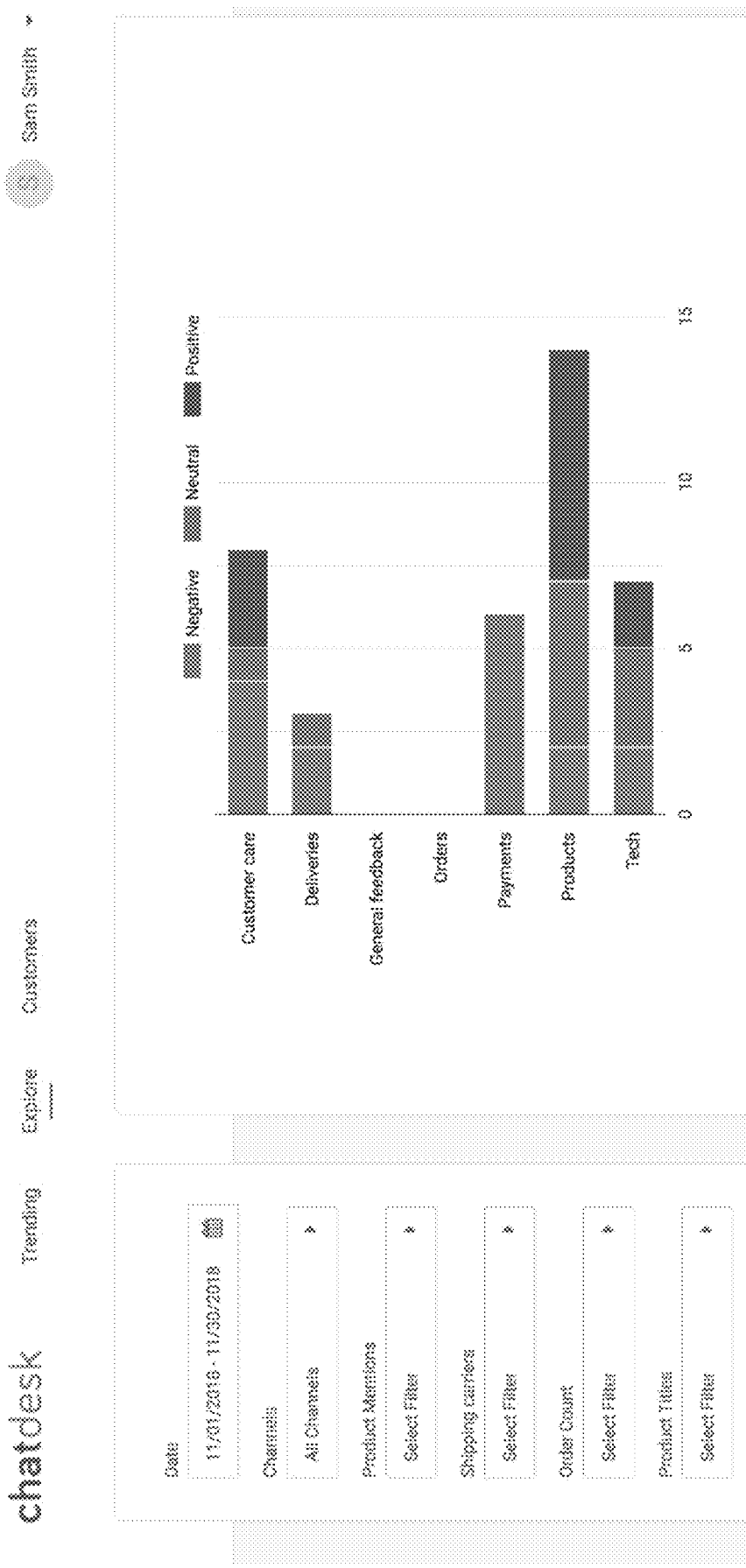

Figure 12 dashboard - Phrases page
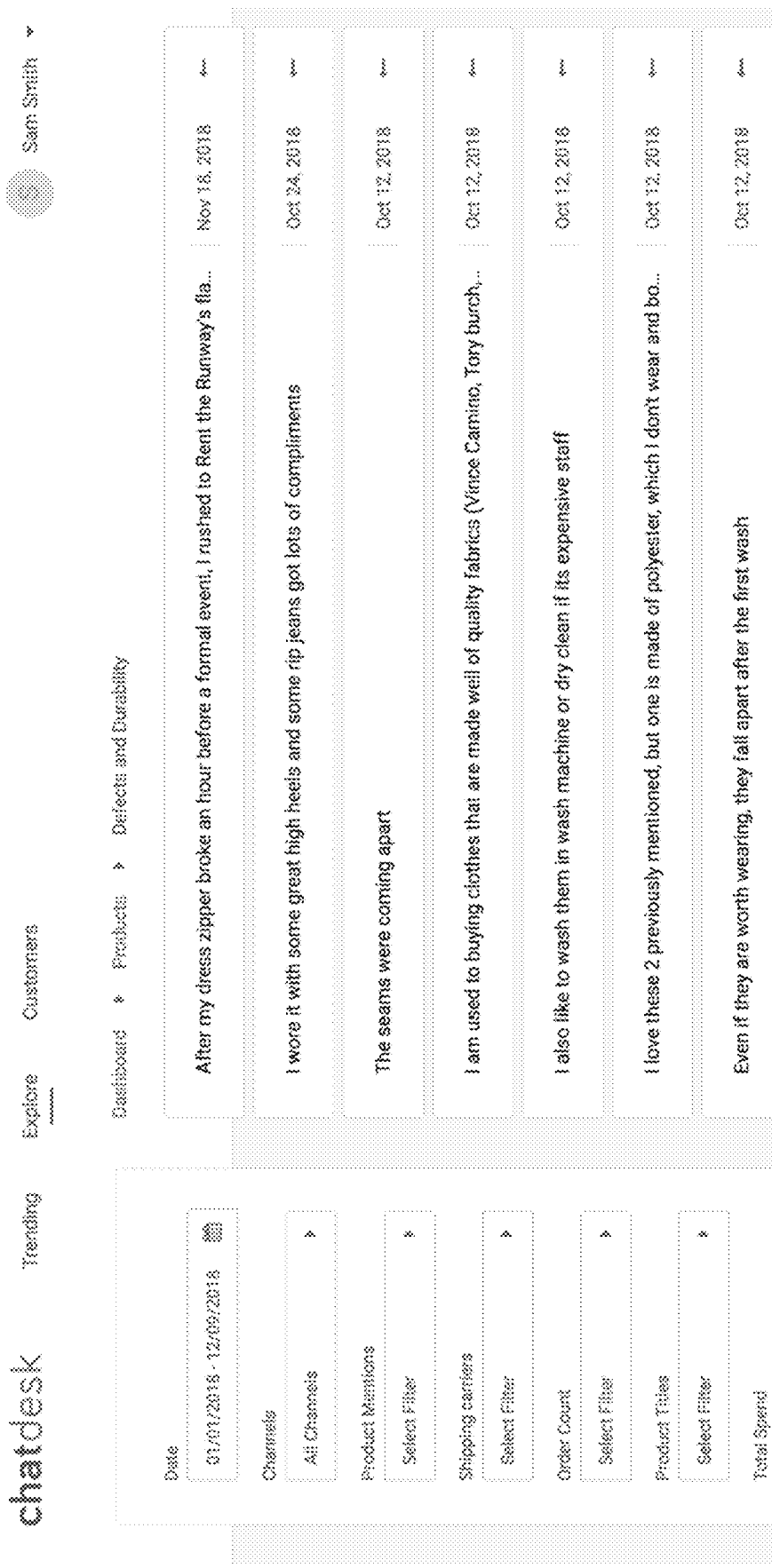

Figure 13 dashboard - Conversation page
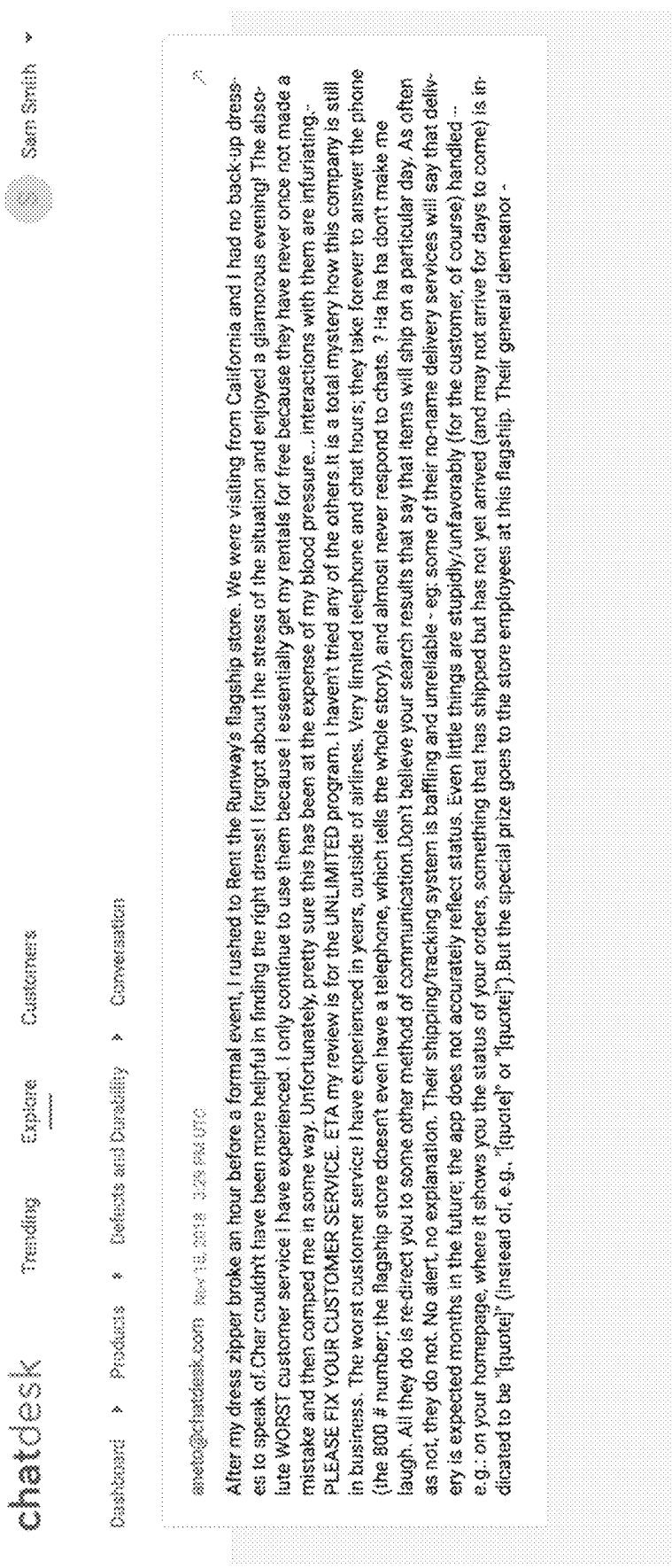

SYSTEM AND METHOD FOR AUTOMATICALLY TAGGING CUSTOMER MESSAGES USING ARTIFICIAL INTELLIGENCE MODELS

FIELD OF INVENTION

The present invention pertains to a system and method for automatically tagging natural language text, and in particular, to such a system and method for automatically tagging customer messages using artificial intelligence models.

BACKGROUND OF THE INVENTION

We currently live in world where people and companies have access to enormous amount of data. For example, when a major new event occurs, people often provide real time reporting of events as they occur through Twitter, Facebook, or other social media platforms. Another example, people post reviews of a product on their social media page or a commerce website like Amazon.

Companies are very interested in this data, especially when the data relates to their target consumer. As a means to determine consumer demand, companies spend millions dollars on market research to understand the needs and wants of their consumers. Companies often conduct primary market research by communicating directly with the consumers to obtain data (e.g., focus groups, surveys) or secondary market research by using previously gathered data (e.g., newspapers, trade journals, social media, product reviews) to determine consumer demand.

Regardless of how companies acquired this data, the data must be organized and analyzed to obtain useful information that companies can use. Due to the speed in which data or information is created, companies must quickly organize and analyze their data in order to grow or to maintain market share within a specific industry.

A large amount of information comes from social media networks and directly from consumers or potential consumers. However, this information or data—like most data—is not organized in a manner that is useful for people and companies to use.

Therefore, what is needed is a system and method for receiving, organizing, and analyzing customer messages through machine learning or other automatic techniques.

SUMMARY OF THE INVENTION

The present invention discloses an improvement to the field of automatically tagging natural language text. According to at least some embodiments, the present invention provides a system and method for receiving customer messages, analyzing them, for example through machine learning or other automatic techniques, and optionally also including manual adjustment of such an analysis. The system features a user computational device, a server gateway, a computer network (i.e., internet) for establishing and allowing a communication connection between the user computational device and the gateway server.

A user interacts with the user computational device through its user interface to supply the device with information, such as customer messages. After receiving these customers messages, the user computational device communicates with the server gateway via the computer network. The server gateway processes the customer messages and sends them to the artificial intelligence system for analysis. The artificial intelligence system then analyzes these customer messages to determine the content by tagging words and phrases with industry specific tags (e.g. product feedback, product defects, shipping delays, etc) as well as tags based on sentiment type (e.g., negative, positive, neutral, sarcasm, mixed) and contact type (e.g., delivery person, influencer, postsale, presale). The artificial intelligence system returns the tagged results, which are displayed on the dashboard of the user computational device or exported to another system for visualization.

The artificial intelligence system features a message text input, tokenizer, artificial engine (AI engine), and message analysis. The message text input receives the customer message and then send the customer message to the tokenizer. The tokenizer then tokenizes the customer message using a text processing to normalize the phrases, remove stop words, and stem the customer message. The AI engine receives and processes the outputs from the tokenizer by using machine learning models, such as deep belief network (DBN) and convolutional neural network (CNN). The outputs from the AI engine are sent to the message analysis. The message analysis tagged the outputs from the AI engine. Afterwards, the tagged results exit the artificial intelligence system for being displayed to the user dashboard.

BRIEF DESCRIPTION OF THE DRAWINGS

These and other features, aspects, and advantages of the present invention will become better understood with regard to the following description, appended claims, and accompanying drawings where:

FIG. 1B illustrates a non-limiting exemplary flow for creating and operating a new model for understanding customer messages, in accordance with one or more implementations of the present invention;

FIG. 1C illustrates a non-limiting exemplary tagging model creation flow, in accordance with one or more implementations of the present invention;

FIG. 2 illustrates a non-limiting exemplary company setup for a new company to register for the system, in accordance with one or more implementations of the present invention;

FIG. 3 illustrates a non-limiting exemplary tagging pipeline, in accordance with one or more implementations of the present invention;

FIG. 4 illustrates a non-limiting exemplary filter tagging flow, in accordance with one or more implementations of the present invention;

FIG. 5 illustrates a non-limiting exemplary retagging pipeline, in accordance with one or more implementation of the present invention;

FIGS. 6A and 6B illustrate a non-limiting exemplary flow for creating a model, in accordance with one or more implementations of the present invention;

FIGS. 7A and 7B illustrate a non-limiting exemplary machine learning models in the form of neural net models, in accordance with one or more implementations of the present invention;

FIG. 8 illustrates a non-limiting exemplary analyst tagging interface, in accordance with one or more implementations of the present invention;

FIG. 9 illustrates a non-limiting exemplary filter tagging interface with various filters for a normalized text, in accordance with one or more implementations of the present invention;

FIG. 11 illustrates a non-limiting exemplary dashboard showing negative sentiment, neutral sentiment, and positive sentiment broke down to various categories, in accordance with one or more implementations of the present invention;

FIG. 12 illustrates a non-limiting exemplary dashboard for a conversation page showing the entire conversation between two different parties, in accordance with one or more implementations of the present invention;

FIG. 13 shows a non-limiting exemplary dashboard for a conversation page showing the entire conversation between the two different parties, in this case the customer and the company providing the service.

DETAILED DESCRIPTION

In describing the novel system and method for receiving customer messages and analyzing them, the provided examples should not be deemed to be exhaustive. While one implementation is described hereto, it is to be understood that other variations are possible without departing from the scope and nature of the present invention.

Figure 1A:
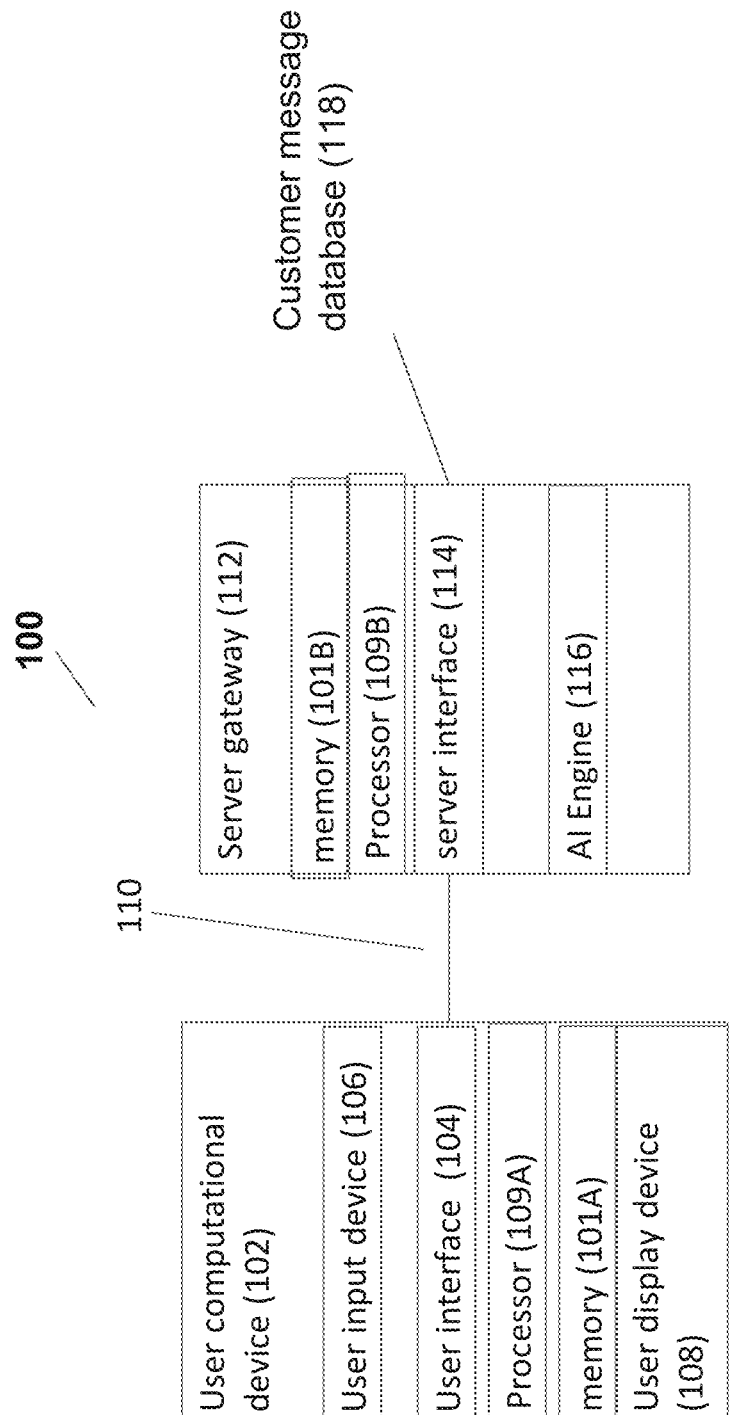
FIG. 1A illustrates a system configured for receiving customer messages and analyzing the customer messages, in accordance with one or more implementations of the present invention.

Turning now to the drawings, there is shown, in FIGS. 1A to 1C, a system and method according to at least some exemplary embodiments of the present invention for enabling customer messages to be received and analyzed. As shown in FIG. 1A, there is provided an exemplary non-limiting system for receiving customer messages, analyzing them, for example through machine learning or other automatic techniques, and optionally also including manual adjustment of such an analysis.

By "message", it is meant any text featuring a plurality of words. The algorithms described herein may be generalized beyond human language texts to any material that is susceptible to tokenization, such that the material may be decomposed to a plurality of features. The text may also include transcribed speech. The terms "message" and "document" are used interchangeably.

A system 100 features a user computational device 102 and a server gateway 112. User computational device 102 and server gateway 112 preferably communicate through a computer network 110. As described above, user computational device may optionally be any type of suitable computational device, including but not limited to a laptop, a desktop, a smartphone, a cellular telephone, a mobile device, and the like. Server gateway 112 may optionally be any type of suitable server, including without limitation a collection of microservices, a virtual machine, or a plurality of hardware and/or virtual machines.

User computational device 102 features a user input device 106, a user interface 104, a memory 101A, and a processor 109A. User input device 106 may optionally include any type of suitable input device hardware, including but not limited to a keyboard, a pointing device such as a mouse or other type of pointing device, or a touch screen, or a combination thereof.

For example, the user interface may include a graphical user interface (GUI) or an interface to input computer-executable instructions that direct the processor to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and/or other user input/output device for communicating with one or more users.

User interface 104 may optionally also be displayed through a user display device 108 and preferably includes the software needed to support receiving user instructions, displaying information to the user, querying the user, and so forth.

Preferably software of user computational device 102 is stored, for example, on a memory 101A and is then operated by a processor 109A. Any method as described herein may be implemented as a plurality of instructions being executed by a processor; for user computational device 102, such instructions would be stored in memory 101A and executed by processor 109A.

Also optionally, memory 101A is configured for storing a defined native instruction set of codes. Processor 109A is configured to perform a defined set of basic operations in response to receiving a corresponding basic instruction selected from the defined native instruction set of codes stored in memory 107A. For example and without limitation, memory 107A may store a first set of machine codes selected from the native instruction set for receiving information from the user through user app interface 104 and a second set of machine codes selected from the native instruction set for transmitting such information to server 106 as crowdsourced information.

As used herein, a processor generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Instructions from user computational device 102 are sent to server gateway 112 through computer network 110. Server gateway 112 features a memory 101B and a server interface 114, for example for optionally communicating with user interface 104 and/or with a database such as a customer message database 118. Customer message database 118 is preferably operated through a computational device, which may be server gateway 112 or a separate computational device.

Server interface 114 receives instructions from user interface 104 and then causes server gateway 112 to perform one or more instructions or operations. These may, for example, be instructions stored in the memory 101B and then operated by a processor 109B. Server interface 114 may also retrieve messages from a customer message database 118 and then provide these messages to an AI engine 116. AI engine 116 then analyzes these customer messages to determine the content thereof according to one or more requirements.

Also optionally, memory 101B is configured for storing a defined native instruction set of codes. Processor 109B is configured to perform a defined set of basic operations in response to receiving a corresponding basic instruction selected from the defined native instruction set of codes stored in memory 101A. For example and without limitation, memory 101A may store a first set of machine codes selected from the native instruction set for receiving information, such as customer messages, from the user through the user input device 106 and the user interface 104 and a second set of machine codes selected from the native instruction set for transmitting such information to the server gateway 112.

For example, and without limitation, the requirements may be related to a template according to a particular type of category of company that the customers are interacting with. For example, if the company sells beauty products, then the related customer messages may for example be related to ordering such beauty products. Concern about a beauty product, for example due to an allergic reaction or other untoward reaction by the skin of the customer, and/or having a beauty product not show up if in fact the customer had ordered it through a web site associated with the company.

For skincare, for example, there can be various skincare concerns such as dull skin, oily skin, dry skin and so forth, different product categories, cleansers, moisturizers, toners, and so forth, and then different product names. Hydrating Day & Night Cream, Pro-glycolic Resurfacing Gel and so forth. These different types of categories within the larger category of companies selling beauty products are important for the analysis of the words and phrases used by the computer.

In fact, information is preferably provided from the company to understand the types of products that they sell, the names of these products, the concerns of their customers, and the types of information the customers typically will communicate to the company. As described in greater detail below, preferably the messages are analyzed by being tagged, for example according to previously established categories or other information within the AI engine, and may then be provided to user computational device 102, for example for further analysis or for manual checking. Various types of classical machine learning techniques and/or neural nets may be used, some non-limiting details of which are given below.

FIG. 1B relates to a non-limiting exemplary flow 120 for creating and operating a new model for understanding customer messages. Beginning with tagging as performed in 121, the computer of the tagging analyst 121 then communicates with a server and tagging interface 122. For example, to determine whether previously tagged words or phrases were tagged incorrectly or to tag new words and phrases. Optionally, the tagging interface 122 is not operated manually but instead is operated automatically. In that case, an AI engine or other machine learning model may be used to tag the words and phrases for machine learning. The tagging analyst 121 computer in that case may be used to check the results and/or to operate the AI engine.

Next tag phrases are preferably placed in the database 123, and the server for training machine learning models 125 receives the tagged phrases for training the new model. After training is complete, the completed model for making new predictions 124 is established and is output. This model is then preferably communicated to a server for processing new messages and sending them for tagging 127, which receives new messages, for example without limitation from email, chat, social media reviews, or from transcribed speech, and so forth 126. Processes them through an AI engine and then may display the results through a dashboard for displaying the results of automatic tagging 128.

FIG. 1C relates to a non-limiting exemplary tagging model creation flow. As shown in a flow, the optionally tags are created in 150 for a particular industry, which may for example be food delivery, beauty, fashion, and so forth. These may be created manually or automatically by analyzing documents related to that industry.

Next, messages are imported for the selected industry from across the web, such as for example without limitation social media reviews, forums, and so forth in 152. The phrases are then tagged from the imported messages with sentiment, contact type, normalizations, industry tags in 154. These may be performed manually or automatically as previously described. Next, the reviewers value the performance, give feedback and approve the tags from the analysts in 156. Again, this process may be performed automatically or manually. Then, the machine learning models are built using the tagged phrases 158. And, again, this process may be performed manually or automatically.

FIG. 2 shows a non-limiting exemplary company setup for a new company to register for this particular system. The company begins in 201 by creating a new account and then selects the industry, such as food delivery, beauty, and fashion. The company has their preferred social media and communication channels, such as for example without limitation Facebook, different types of email, which for example may be help desk email systems like Zendesk Email. Various steps and reviews such as Yotpo reviews, Yelp, and so forth, and authentication credentials for these channels to the server in 202.

Next, the company edits their company profile and invites users to access their dashboard 203. These users are preferably users from within the company but may also be external consultants. Next, the company's categorized by industry in 204. This may be performed automatically and manually. If performed automatically it is preferably performed based on the description of the customer's products, and also communication with their customers. These product descriptions and customer interactions may be analyzed, for example, with a machine learning algorithm to categorize the company according to particular industry and/or sub-industry.

Next, one or more appropriate tagging models are selected in 106, these tagging models relate not only to the industry but preferably also relate to the types of interactions with customers. For example, is the company a B to C company that is selling directly to consumers, or alternatively is the company a B to B company that is selling to another company? This type of business model would then affect the tagging model which is selected, which again may be selected automatically or manually.

FIG. 3 relates to a non-limiting exemplary tagging pipeline. As shown, messages are pushed into the Chatdesk system via webhooks and the API, such as for example Facebook posts, emails of various types, including without limitation Zendesk emails, reviews, and so forth in 301. Additionally, the system also preferably pulls messages into the system from periodic polling, such as reviews of various types, Twitter, Facebook, other types of social media channels and emails in 302.

This information is then fed into a process that begins at 303 by redacting messages to remove sensitive information, such a phone numbers and addresses, which is preferably performed automatically. It is then checked for messages that don't need to be tagged, such as an unusually short text such as no or yes or please in 304. Extraneous text and boilerplate text are removed, such as for example without limitation email signatures in 305.

The system then checks for duplicate messages which have been tagged previously in 306. This may be an exact duplicate or due to the fact that sensitive information, personal information and boilerplate has been removed, that this message actually resembles or is a direct duplicate or a previously tagged message. This is preferably performed automatically.

Next, industry tags and sentiment are applied preferably using a machine learning model, such as that described for example in FIG. 1, and any messages that are not tagged by the model may then be tagged manually and their results then fed back into the model for further training. Preferably, the tagged phrases are available for display on the dashboard in 308.

FIG. 4 relates to non-limiting exemplary filter tagging flow. The flow preferably begins by creating filter groups and attaching them to normalizations such as beauty products, shipping carriers and so forth in 401. Again, this may be performed manually or automatically and may also be an extension of a previously analyzed category. For example if a company uses the system and that company falls into a previously determined category, industry category, then that company may be benefit from using previously determined filter groups if a category and subcategory determination is performed. Then optionally if a category determination may be performed but the subcategory is different, then in that case there may be further automatic and/or manual analysis to create these filter groups.

Next, filters are created and attached to the filter groups in 402. Non-limiting examples of such filters, for example for beauty products, which include lip shades, different types of delivery services, such as USPS, FedEx, DHL, and so forth. Next, normalization text is attached to the filters. So, for example, for a lip shade, a particular lip shade color may be red or Dope Taupe or some other type of text that describes a particular shade. The normalization text is attached to the shade either automatically or manually so that different lip shade names may be recognized.

The company then uses filters on the dashboard to filter feedback in 404, such as for example sentiment analysis and other types of analysis. A retagging pipeline is described in a non-limiting exemplary flow in FIG. 5. The quality analyst then identifies a phrase to be removed from the dashboard in 501, this may be flagged by a person or alternatively may be flagged by an automatic model.

The phrase is preferably sent for retagging in 502, which may be performed manually or automatically. An analyst changes the tags of the phrase and the phrase is redisplayed on the dashboard in 503, and again this may be performed manually or automatically. Then the model is retrained so that any similar phrases in the future are tagged more accurately in 504. Preferably, however, once a phrase has been removed it is blacklisted in 505. Any new incoming phrases that match the blacklisted phrase are prevented from being tagged and removed from the dashboard in 506, and regular expressions are added to the pipeline so that any similar phrases can be removed from the dashboard in 507. This is to prevent future errors.

Figure 6B:
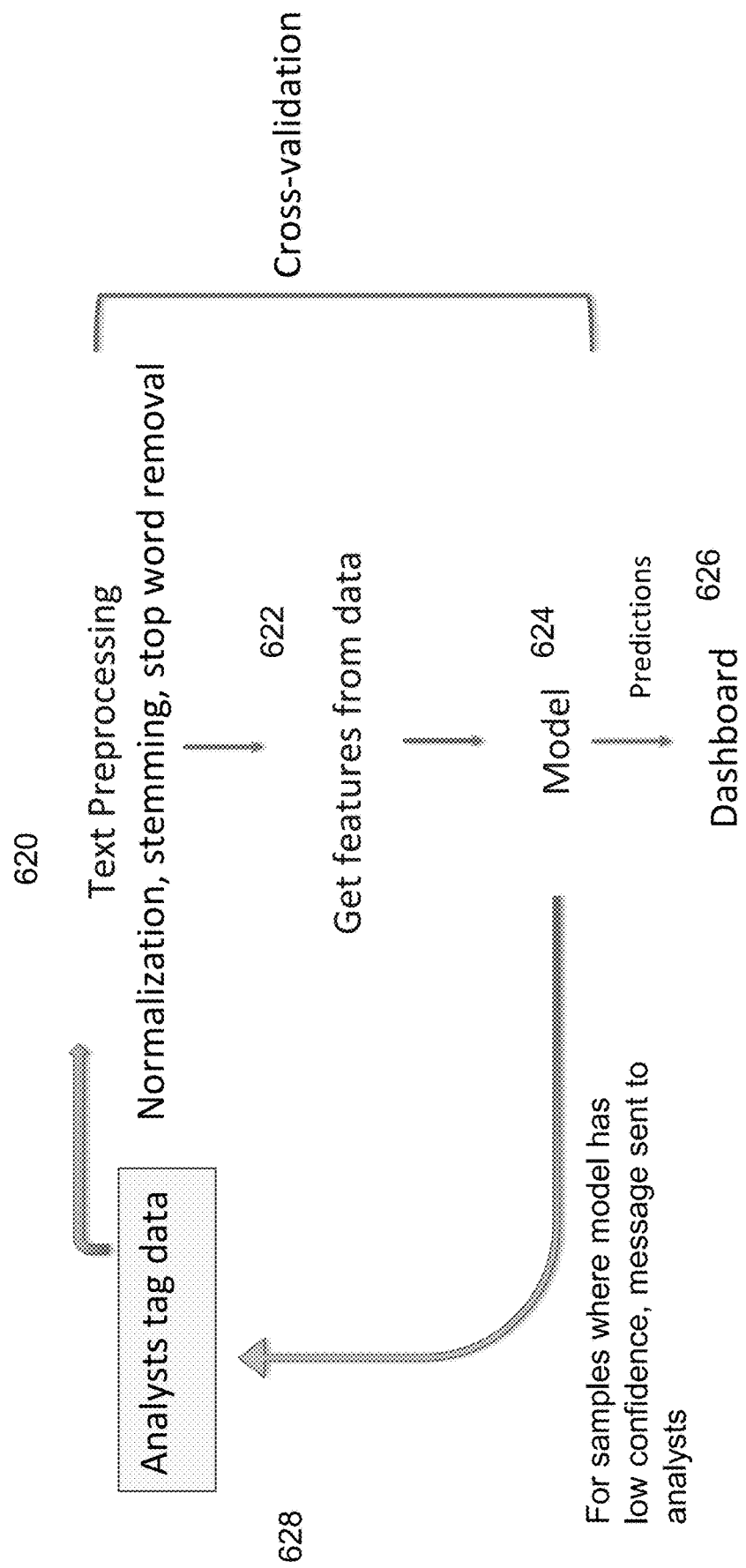

A non-limiting exemplary flow for creating a model is shown in FIGS. 6A and 6B. Turning now to FIG. 6A there is shown a flow that begins with a step 601, in which phrases that have been tagged by analysts are run through text preprocessing to normalize the phrases, remove stop words and are stemmed. Next, in step 602, features are extracted from the preprocess information, and they are transformed into a vector representation using a library, such as for example without limitation Word2Vec.

The preprocessed information may initially be a bag of words with location information, the vector representation may then also include neighborhoods, such as how Word2Vec operates by determining the neighborhoods of words, what words are similar in location or closer in location to other words.

Next, models are generated from the vector representations, for example without limitation using techniques such as logistic regression, preferably then model hyper parameters are tuned to achieve the highest prediction score accuracy in 603.

Next, optionally the class and balance of the phrases that have been tagged by the analysts are analyzed. Tags with low prediction accuracy and a low number of samples are ignored in 604. Tags that have the label in distinctiveness and high confusion matrix are preferably combined with other tags to create macro tags in 605, and then the models are published and begin generating live predictions of phrases and tags on the company dashboard in 606.

FIG. 6B relates to an exemplary overall flow, beginning with 620 text reprocessing is performed as previously described, including normalization, stemming, and stop word removal. A stop word is a word that is so common that its inclusion may be problematic such as a, and, the, and so forth. Next, features from the data are obtained in 622. These are modeled in 624, predictions are made and are sent to the dashboard in 626. However, if the model has a low confidence for particular samples, then the message is sent to the analysts and the analyst may perform a manual tagging in 628 or alternatively this may be a separate automatic process. The steps of 620, 622, and 624 are preferably performed with cross-validation.

FIGS. 7A and 7B show non-limiting exemplary machine learning models in the form of neural net models. Various types of neural net models could be used with the present invention are considerably encompassed herein. As shown in FIG. 7A, there is a first system 700 featuring message text input 702, which is tokenized by a tokenizer 718, before being fed as input 710 to an AI engine 706.

Various methods are known in the art for tokenization. For example and without limitation, a method for tokenization is described in Laboreiro, G. et al (2010, Tokenizing microblogging messages using a text classification approach, in 'Proceedings of the fourth workshop on Analytics for noisy unstructured text data', ACM, pp. 81-88).

Once the document has been broken down into tokens, optionally less relevant or noisy data is removed, for example to remove punctuation and stop words. A non-limiting method to remove such noise from tokenized text data is described in Heidarian (2011, Multi-clustering users in twitter dataset, in 'International Conference on Software Technology and Engineering, 3rd (ICSTE 2011)', ASME Press). Stemming may also be applied to the tokenized material, to further reduce the dimensionality of the document, as described for example in Porter (1980, 'An algorithm for suffix stripping', Program: electronic library and information systems 14(3), 130-137).

The tokens may then be fed to an algorithm for natural language processing (NLP) as described in greater detail below. The tokens may be analyzed for parts of speech and/or for other features which can assist in analysis and interpretation of the meaning of the tokens, as is known in the art.

Alternatively or additionally, the tokens may be sorted into vectors. One method for assembling such vectors is through the Vector Space Model (VSM). Various vector libraries may be used to support various types of vector assembly methods, for example according to OpenGL. The VSM method results in a set of vectors on which addition and scalar multiplication can be applied, as described by Salton & Buckley (1988, 'Term-weighting approaches in automatic text retrieval', Information processing & management 24(5), 513-523).

To overcome a bias that may occur with longer documents, in which terms may appear with greater frequency due to length of the document rather than due to relevance, optionally the vectors are adjusted according to document length. Various non-limiting methods for adjusting the vectors may be applied, such as various types of normalizations, including but not limited to Euclidean normalization (Das et al., 2009, 'Anonymizing edge-weighted social network graphs', Computer Science, UC Santa Barbara, Tech. Rep. CS-2009-03); or the TF-IDF Ranking algorithm (Wu et al, 2010, Automatic generation of personalized annotation tags for twitter users, in 'Human Language Technologies: The 2010 Annual Conference of the North American Chapter of the Association for Computational Linguistics', Association for Computational Linguistics, pp. 689-692).

One non-limiting example of a specialized NLP algorithm is word2vec, which produces vectors of words from text, known as word embeddings. Word2vec has a disadvantage in that transfer learning is not operative for this algorithm. Rather, the algorithm needs to be trained specifically on the lexicon (group of vocabulary words) that will be needed to analyze the documents.

The outputs 712 are then provided as message analysis 704. In this non-limiting example, AI engine 706 features a DBN (deep belief network) 708, featuring a particular type of neural network 714 that receives inputs from input 710, and proceeds to provide outputs to output 712.

A DBN is a type of neural network composed of multiple layers of latent variables ("hidden units"), with connections between the layers but not between units within each layer.

FIG. 7B shows another non-limiting example of a system that may include an AI engine as shown herein. As shown in the system 750, again the message text input 702 and tokenizer 718, and message analysis 704 have the same or similar functions as in 7A. There is again an AI engine 706, but this particular one features a CNN (convolutional neural network) 758, featuring convolutional layers 764, followed by neural network 762. Input 710 and output 712 preferably operate as previously described.

A CNN is a type of neural network that features additional separate convolutional layers for feature extraction, in addition to the neural network layers for classification/identification. Overall, the layers are organized in 3 dimensions: width, height and depth. Further, the neurons in one layer do not connect to all the neurons in the next layer but only to a small region of it. Lastly, the final output will be reduced to a single vector of probability scores, organized along the depth dimension. It is often used for audio and image data analysis, but has recently been also used for natural language processing (NLP; see for example Yin et al, Comparative Study of CNN and RNN for Natural Language Processing, arXiv:1702.01923v1 [cs.CL] 7 Feb. 2017).

FIG. 8 shows a non-limiting analyst tagging interface example. This would be for manual tagging but a similar process could also be performed for automatic tagging in which a message is shown and the manual tagger needs to determine sentiment, contact type, normalization and other information.

FIG. 9 shows a non-limiting exemplary filter tagging interface with various filters for a normalization text. For this non-limiting example there is shown the different types of filters, which for example may be lip shades in level 1, and then a level 2 filter needs to be selected. The normalization text is shown. For example Dope Taupe in this case is lip shade, lip shade is also lip shades, but a different color were to be included then that would also presumably be a lip shade, if it were a color of lipstick, however an eye shadow color would not be labeled as a lip shade for level 1 filter. Instead it would have a level 1 filter of eye shadow.

Figure 10:
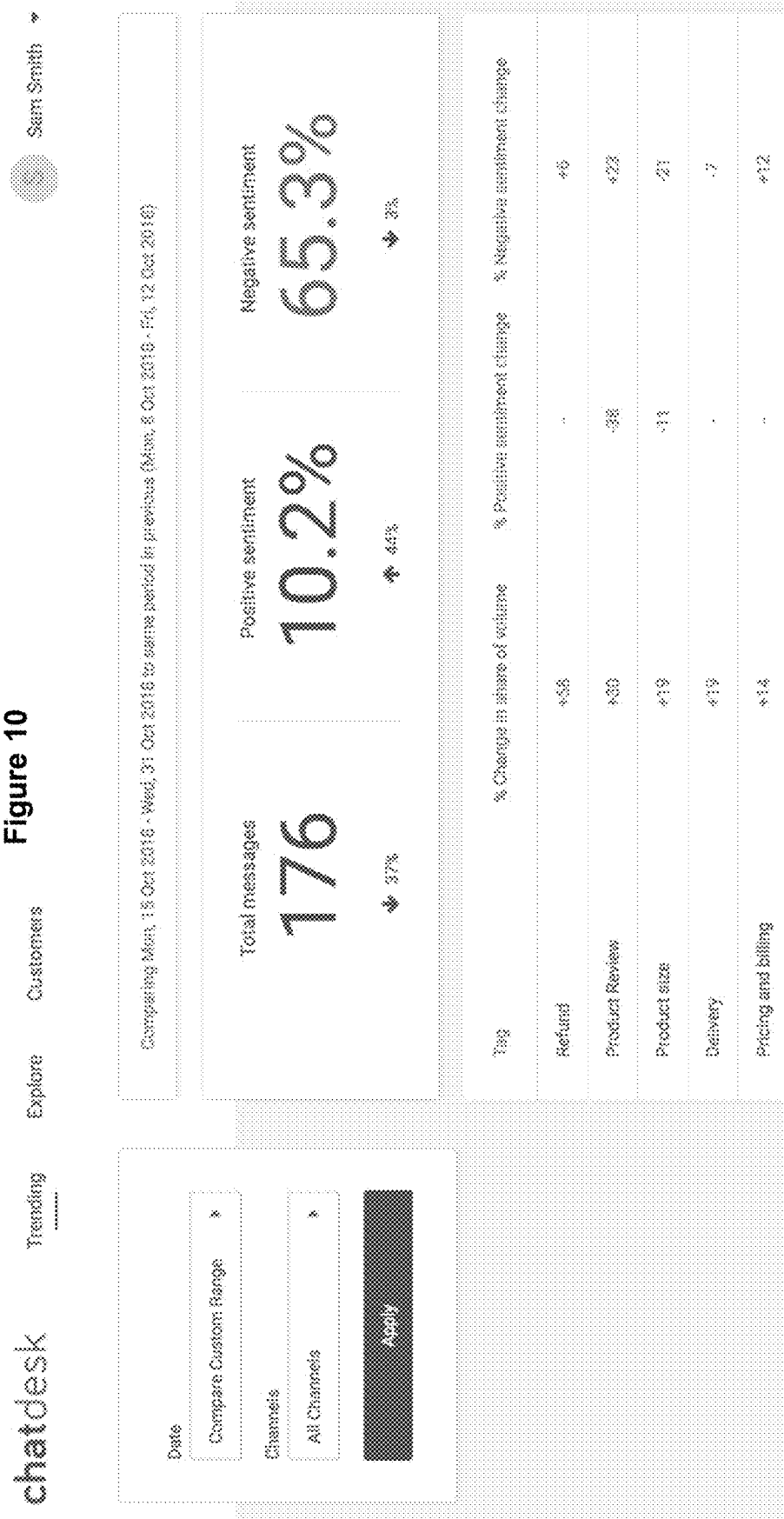
FIG. 10 illustrates a non-limiting exemplary message sentiment analysis showing the total number of messages analyzed, in accordance with one or more implementations of the present invention.

FIG. 10 shows a non-limiting exemplary message sentiment analysis showing the total number of messages analyzed, for example for a particular time period, which relates to the total number of messages received, the amount of positive sentiment and the amount of negative sentiment.

FIG. 11 shows a non-limiting exemplary dashboard showing negative sentiment, neutral sentiment, and positive sentiment broke down to various categories, such as for example customer care, deliveries, products, and so forth.

FIG. 12 shows a non-limiting exemplary dashboard for phrases, showing all of the different phrases that have been provided, and allowing the user to manually review the phrases and how they have been analyzed.

FIG. 13 shows a non-limiting exemplary dashboard for a conversation page showing the entire conversation between the two different parties, in this case the customer and the company providing the service.

What is claimed is:

1. A method, comprising:
    receiving, by a server gateway, training messages,
        wherein the training messages comprising text featuring a word or a plurality of words;
    generating, by the server gateway, tags to categorize the training messages,
        wherein the tags are based on industry tags,
        wherein the tags are based on sentiment tags,
        wherein the tags are based on contact tags, and
        wherein the tags are based on normalization tags;
    training, by the server gateway, an artificial intelligence system, with the training messages, to generate one or more tagging models and to generate a text processing model;
    receiving, by the server gateway, customer messages;
        wherein the customer messages comprising text featuring a word or a plurality of words;
    processing, by the server gateway, the customer messages, with the one or more tagging models, to generate tagged data and untagged data,
        wherein the tagged data is associated with one or more of:
            the industry tags,
            the sentiment tags,
            the contact tags, and
            the normalization tags,
        wherein the untagged data includes one or more of:
            one or more stop words, and
            one or more blacklisted words;
    processing, by the server gateway, the tagged data, with the artificial intelligence system, to generate processed data to be displayed on a user computational device;
        wherein the processed data comprises
            the customer messages, the tags associated the customer messages;
processing, by the server gateway, the untagged data selected by an analyst, with the artificial intelligence system, to generate additional one or more tagging models,
wherein the analyst reviews the untagged data and selects a complete set or subset of the untagged data;
providing, by the server gateway, the processed data to one or more computational devices.

2. The method of claim 1, wherein the industry tags include one or more words having a particular meaning in a specific industry; wherein the sentiment tags include one or more words having an emotional tone; wherein the contact tags include one or more words describing an event or a type of person or persons; and wherein the normalization tags include one or more words describing an idea or concept that has been reduced to a standardized form.

3. The method of claim 1, wherein training the artificial intelligence system comprising the steps of:
creating the tags for a specific industry, wherein the tags are provided by the analyst;
inputting the training messages;
tagging, the training messages with the industry tags, the sentiment tags, the contact tags, and the normalization tags;
inputting, by the analyst, the tagged the training messages into a text processor;
extracting features from output of the text processor;
transforming the features into vector representations;
generating the one or more tagging models from the vector representations;
tuning hyper parameters of the one or more tagging models to achieve a highest prediction score accuracy;
analyzing a class imbalance of phrases tagged by the analyst;
creating macro tags by combining tags having a label indistinctness and a high confusion matrix with other tags;
publishing the one or more tagging models; and
generating live predictions of phrases and the tags by the published one or more tagging models.

4. The method of claim 3, wherein the text processor processes the tagged data by normalizing phrases, by removing stop words, and by stemming.

5. The method of claim 1, wherein training the artificial intelligence system comprises the steps of:
receiving the customer messages;
tokenizing, by a tokenizer, the customer messages, wherein the tokenizer is configured to reduce the customer messages to tokens, wherein the tokens include features and parts of speech of the customer messages;
transmitting outputs of the tokenizer to an artificial intelligence (AI) engine;
processing, by the AI engine, the outputs of the tokenizer; and
analyzing, by a message analysis, the outputs from the AI engine.

6. The method of claim 5, wherein the AI engine includes one or more of:
a deep belief network (DBN), wherein the DBN further comprises multiple layers of latent variables ("hidden units") with connections between the multiple layers but not between units within each layer; or
a convolutional neural network (CNN), where the CNN further comprises additional separate convolutional layers for extraction, in addition to neural network layers for classification/identifications.

7. The method of claim 1, wherein processing the customer messages, with the one or more tagging models, to generate tagged data and untagged data comprises:
redacting the customer messages for sensitive information,
removing the customer messages that are duplicates, and
removing the customer messages having extraneous text and boilerplate text.

8. The method of claim 1, further comprising generating, by the server gateway, a filtering process to filter the processed data to be displayed on a user computational device, the filtering process comprising the steps of:
creating filter groups,
attaching the filter groups to the normalization tags,
creating filters,
attaching the filters to the filter groups, and
attaching the normalization tags to the filters.

9. The method of claim 1, further comprising retagging, by the server gateway, the tagged data, with the artificial intelligence system, to update the one or more tagging models, the retagging comprising the steps of:
reviewing accuracy of tagged data,
untagging the tagged data if the tagged data is blacklisted,
retagging the tagged data with an appropriate tag, if tagged data is mistagged,
inputting the retagged data into a text processor;
extracting features from output of the text processor;
transforming the features into vector representations;
generating the one or more tagging models from the vector representations;
tuning hyper parameters of the one or more tagging models to achieve a highest prediction score accuracy;
analyzing a class imbalance of phrases tagged by the analyst;
creating macro tags by combining tags having a label indistinctness and a high confusion matrix with other tags;
publishing the one or more tagging models; and
generating live predictions of phrases and the tags by the published one or more tagging models.

10. The method of claim 1, wherein the artificial intelligence system comprises
a message text input for inputting the customer messages,
a tokenizer for tokenizing the customer messages, the tokenizer is configured to reduce the customer messages to tokens, wherein the tokens include features and parts of speech of the customer messages,
an artificial intelligence (AI engine) for processing outputs from the tokenizer, and
a message analysis for tagging the outputs from the AI engine.

11. A system comprising:
a computer network;
a user computational device;
a database for storing customer messages;
a server gateway in communication with the user computational device through the computer network, the server gateway receives customer messages from the database, the server gateway comprising
one or more memories; and
one or more processors, communicatively coupled to the one or more memories, configured to:
receive training messages;
generate tags to identify and classify the training messages,
wherein the tags are based on industry tags,
wherein the tags are based on sentiment tags, wherein the tags are based on contact tags, and
wherein the tags are based on normalization tags;
train an artificial intelligence system, with the training messages, to generate one or more tagging models;
train the artificial intelligence system, with the training messages, to generate a text processing model;
receive the customer messages;
process the customer messages, with the one or more tagging models, to generate tagged data and untagged data,
wherein the tagged data is associated with one or more of the industry tags, the sentiment tags, the contact tag, and the normalization tags,
wherein the untagged data includes one or more of:
one or more stop words, and
one or more blacklisted words;
process the tagged data, with the artificial intelligence system, to generate processed data to be displayed on the user computational device;
wherein the processed data comprises
the customer messages, and
the tags associated the customer messages
process the untagged data selected by an analyst, with the artificial intelligence system, to generate additional one or more tagging models,
wherein the analyst reviews the untagged data and selects a complete set or subset of the untagged data;
provide the processed data to the user computational device;
generate a filtering process to filter the processed data to be displayed on the user computational device; and
retagging the tagged data, with the artificial intelligence system, to update the one or more tagging models.

12. The system of claim 11, wherein the industry tags identify one or more words having a particular meaning in a specific industry; wherein the sentiment tags identify one or more words having an emotional tone; wherein the contact tags identify one or more words describing an event or a type of person or persons; wherein the normalization tags identify one or more words describing an idea or concept that has been reduced to a standardized form.

13. The system of claim 11, wherein the artificial intelligence system comprises
a message text input for inputting the customer messages,
a tokenizer for tokenizing the customer messages, the tokenizer is configured to reduce the customer messages to tokens, wherein the tokens include features and parts of speech of the customer messages,
an artificial intelligence (AI engine) for processing outputs from the tokenizer, and
a message analysis for tagging the outputs from the AI engine.

14. The system of claim 13, wherein the AI engine includes one or more of:
a comprises a deep belief network (DBN), where the DBN further comprises multiple layers of latent variables ("hidden units") with connections between the multiple layers but not between units within each layer; or
a convolutional neural network (CNN), where the CNN further comprises additional separate convolutional layers for extraction, in addition to the neural network layers for classification/identifications.

15. The system of claim 11, wherein the user computational device comprises a user input device, a user interface, a user processor, a user memory, and a user display device, wherein the user memory stores a defined native instruction set of codes; wherein the user processor is configured to perform a defined set of basic operations in response to receiving a corresponding basic instruction selected from the defined native instruction of codes; wherein the user computational device comprises a first set of machine code selected from the native instruction set for receiving information through the user interface and the user input device, and a second set of machine codes selected from the native instruction set for transmitting the information to the server gateway.

16. A method, comprising:
receiving, by a server gateway, customer messages;
wherein the customer messages comprising text featuring a word or a plurality of words;
processing, by the server gateway, the customer messages, with tagging models, to generate tagged data and untagged data,
wherein the tagged data include tags categorizing the customer messages based on
industry tags, wherein the industry tags include one or more words having a particular meaning in a specific industry,
sentiment tags, wherein the sentiment tags include one or more words having an emotional tone,
contact tags, wherein the contact tags include one or more words describing an event or a type of person or persons, and
normalization tags, wherein the normalization tags include one or more words describing an idea or a concept that has been reduced to a standardized form,
wherein the untagged data includes one or more of:
one or more stop words, and
one or more blacklisted words;
processing, by the server gateway, the tagged data, with an artificial intelligence system, to generate processed data;
wherein the processed data includes
the customer messages,
the tags categorizing the customer messages,
wherein the artificial intelligence system includes
a message text input for inputting the customer messages,
a tokenizer for tokenizing the customer messages, the tokenizer is configured to reduce the customer messages to tokens, wherein the tokens includes features and parts of speech of the customer messages,
an artificial intelligence (AI engine) for processing outputs from the tokenizer, and
a message analysis for tagging the outputs from the AI engine; and
processing, by the server gateway, the untagged data selected by an analyst, with the artificial intelligence system, to generate subsequent tagging models,
wherein the analyst reviews the untagged data and selects a complete set or subset of the untagged data;
retagging, by the server gateway, the untagged data, with the artificial intelligence system, to update the processed data; and
providing, by the server gateway, the processed data to one or more computational devices.

17. The method of claim 16, wherein the artificial intelligence system is configured to generate the tagging models, wherein training of the artificial intelligence system comprising the steps of:
- creating the tags for a specific industry, wherein the tags are provided by the analyst;
- inputting training messages, wherein the training messages include text featuring a word or a plurality of words;
- tagging, the training messages with the industry tags, the sentiment tags, the contact tags, and the normalization tags;
- inputting, by the analyst, the tagged training messages into a text processor;
- extracting features from output of the text processor;
- transforming the features into vector representations;
- generating the tagging models from the vector representations;
- tuning hyper parameters of the tagging models to achieve a highest prediction score accuracy;
- analyzing a class imbalance of phrases tagged by the analyst;
- creating macro tags by combining tags having a label indistinctness and a high confusion matrix with other tags;
- publishing the tagging models; and
- generating live predictions of phrases and the tags by the publishing of the tagging models.

18. The method of claim 16, wherein training the artificial intelligence system comprises the steps of:
- receiving the customer messages;
- tokenizing, by the tokenizer, the customer messages, wherein the tokenizer is configured to reduce the customer messages to tokens, wherein the tokens include features and parts of speech of the customer messages;
- transmitting the outputs of the tokenizer to an artificial intelligence (AI) engine;
- processing, by the AI engine, the outputs of the tokenizer; and
- analyzing, by a message analysis, the outputs from the AI engine.

19. The method of claim 16, the retagging comprising the steps of:
- reviewing accuracy of tagged data,
- untagging the tagged data if the tagged data is blacklisted,
- retagging the tagged data with an appropriate tag, if the tagged data is mistagged,
- inputting the retagged data into a text processor;
- extracting features from output of the text processor;
- transforming the features into vector representations;
- generating the tagging models from the vector representations;
- tuning hyper parameters of the tagging models to achieve a highest prediction score accuracy;
- analyzing a class imbalance of phrases tagged by the analyst;
- creating macro tags by combining tags having a label indistinctness and a high confusion matrix with other tags;
- publishing the tagging models; and
- generating live predictions of phrases and the tags by the publishing of the tagging models.

* * * * *